No. 774,612. PATENTED NOV. 8, 1904.
E. STEAD.
GRINDING MACHINE.
APPLICATION FILED JUNE 7, 1904.
NO MODEL.

Witnesses
Phil. E. Barnes.
C. B. Lakestone

Inventor
Ernest Stead.
By Victor J. Evans
Attorney

No. 774,612. Patented November 8, 1904.

UNITED STATES PATENT OFFICE.

ERNEST STEAD, OF BINGHAMTON, NEW YORK.

GRINDING-MACHINE.

SPECIFICATION forming part of Letters Patent No. 774,612, dated November 8, 1904.

Application filed June 7, 1904. Serial No. 211,523. (No model.)

*To all whom it may concern:*

Be it known that I, ERNEST STEAD, a citizen of the United States, residing at Binghamton, in the county of Broome and State of New York, have invented new and useful Improvements in Grinding-Machines, of which the following is a specification.

This invention relates to grinding-machines, the object of the invention being to provide a chuck or holder for receiving and properly sustaining the grinding-disks, the construction of the chuck or holder being such that a grinding-disk of concavo-convex form in cross-section may be reversed to present either side for grinding, the chuck and disk being so constructed and related to each other that the disk is properly sustained in either position and thoroughly supported in order to insure the best results during the grinding operation and held against rotation relatively to the chuck or holder in which it is mounted.

With the above and other objects in view, the nature of which will more fully appear as the description proceeds, the invention consists in the novel construction, combination, and arrangement of parts, as herein fully described, illustrated, and claimed.

In the accompanying drawings, Figure 1 is a side elevation of the chuck or holder embodying the present invention, showing a grinding-disk mounted therein with the convex side thereof presented as a working surface. Fig. 2 is a central vertical section through the same, showing the grinding-disk reversed in its position as compared with Fig. 1. Fig. 3 is a detail edge view of the grinding-disk, showing the annular flange thereof.

Like reference-numerals designate corresponding parts in all the figures of the drawings.

The chuck or holder contemplated in this invention somewhat resembles an ordinary hour-glass, the upper body portion 1 thereof being substantially conical in shape and reversely disposed to the lower portion 2 thereof, which is more of a hemispherical shape, the outer surface thereof being rounded to form a hood or rim which extends considerably outside of and around the actuating-spindle 3, thus protecting the bearings of the machine of which the spindle forms a part from the material or powder resulting from the grinding operation. Within the rim or head 2 there is arranged a sleeve 4, preferably tapered inside, adapting it to fit upon a correspondingly-tapered upper extremity of the spindle 3, as shown in Fig. 2.

The upper portion of the body 1 is preferably in the form of a true cylinder, as shown at 5, and the extreme upper edge thereof is rabbeted, as shown at 6, to form an annular shoulder or ledge 7, upon which the grinding-disk 8 finds its support.

The grinding-disk may be of any suitable shape or form in cross-section, the one illustrated in the drawings being concavo-convex or being provided with one convex surface and one concave surface, both surfaces being used for grinding purposes. In carrying out the present invention the disk is provided with an annular circumferential flange 9, which extends entirely around the body of the disk and is provided at a suitable point with an offset, preferably in the form of an integral key or projection 10, while the upper portion 5 of the chuck or holder is provided with a slot or key-seat 11, in which the offset or key 10 is received, thus preventing relative rotative movement between the grinding-disk and the chuck or holder. The construction just described also adapts the disk to be readily removed and reversed and replaced in the chuck or holder.

The improved chuck or holder hereinabove described is especially adapted for holding disks used in grinding lenses, and by reason of the fact that the disk is capable of being reversed one chuck will answer the purposes of many, as a whole set of disks having grinding-surfaces at different curves, contours, or pitches may be interchangeably applied and used in connection with the chuck or holder, thus effecting a saving in material, labor, and time.

Having thus described the invention, what is claimed as new is—

1. The chuck or holder embodying a rabbeted edge, the combination with a grinding-disk having an upper and lower grinding-surface, said disk being provided with a circumferential flange to be inserted in the rabbeted edge portion of the chuck to present either grinding-surface of the disk for operation.

2. A chuck or holder embodying a rabbeted edge portion and a key-seat in said portion, the combination with a grinding-disk provided with a circumferential flange, said disk having an upper and a lower grinding-surface and being provided with a projecting key, said flange and key coöperating with the rabbeted portion and key-seat of the holder, to present either grinding-surface of the disk for operation.

3. A chuck or holder provided with a rabbeted edge portion, and a protecting rim or hood embracing the spindle-receiving portion of the chuck, in combination with a grinding-disk embodying a circumferential flange removably fitted in the rabbeted portion of the holder whereby the grinding-disk is made reversible, substantially as described.

4. A chuck or holder for the purpose described embodying upper and lower portions flaring in opposite directions, one of said portions being rabbeted in its extreme edge to form a seat, and a grinding-disk provided with a circumferential flange removably fitted in said rabbeted seat, the grinding-disk being reversible with respect to the chuck, substantially as described.

In testimony whereof I affix my signature in presence of two witnesses.

ERNEST STEAD.

Witnesses:
HULBERT A. LACEY,
THOMAS B. KATTELL.